US010563752B2

(12) United States Patent
Fredriksson et al.

(10) Patent No.: US 10,563,752 B2
(45) Date of Patent: Feb. 18, 2020

(54) GEAR SHIFTER ASSEMBLY FOR A VEHICLE

(71) Applicant: Kongsberg Automotive AB, Mullsjoe (SE)

(72) Inventors: Robert Fredriksson, Jönköping (SE); Andreas Jonsson, Huskvarna (SE); Bengt Hermansson, Mullsjö (SE)

(73) Assignee: Kongsberg Automotive AB, Mullsjoe (SE)

( * ) Notice: Subject to any disclaimer, the term of this patent is extended or adjusted under 35 U.S.C. 154(b) by 305 days.

(21) Appl. No.: 15/536,434

(22) PCT Filed: Dec. 19, 2014

(86) PCT No.: PCT/EP2014/078845
§ 371 (c)(1),
(2) Date: Jun. 15, 2017

(87) PCT Pub. No.: WO2016/096050
PCT Pub. Date: Jun. 23, 2016

(65) Prior Publication Data
US 2017/0350499 A1 Dec. 7, 2017

(51) Int. Cl.
*F16H 59/00* (2006.01)
*F16H 59/02* (2006.01)
(Continued)

(52) U.S. Cl.
CPC ....... *F16H 59/0204* (2013.01); *F16H 59/105* (2013.01); *F16H 61/36* (2013.01); *F16H 59/0278* (2013.01); *F16H 2059/026* (2013.01)

(58) Field of Classification Search
CPC .... F16H 59/0204; F16H 61/36; F16H 59/105; F16H 59/0278; F16H 2059/026
(Continued)

(56) References Cited

U.S. PATENT DOCUMENTS 5,622,079 A * 4/1997 Woeste ............... F16H 59/0204
74/473.18
5,899,115 A * 5/1999 Kataumi ............. F16H 59/0204
74/473.18
(Continued)

FOREIGN PATENT DOCUMENTS

DE  199 18 508 A1  11/2000
JP  2009 113639 A   5/2009
WO  01/08919 A1    2/2001

OTHER PUBLICATIONS

International Search Report and Written Opinion (PCT/EP2014/078845); dated Nov. 11, 2015.

*Primary Examiner* — Victor L MacArthur
(74) *Attorney, Agent, or Firm* — Howard & Howard Attorneys PLLC

(57) ABSTRACT

A gear shifter assembly for a vehicle is described herein. The gear shifter assembly includes a base to be fixed in a vehicle, a shifter yoke mounted to the base by a main pivot shaft, a shift lever mounted to the shifter yoke by a pivotal bearing arranged to allow pivotal movements about a second pivotal axis perpendicular to the first pivotal axis, and an intermediate joint that provides the pivotal bearing of the shift lever. The intermediate joint is attached to the lower end of the shift lever by receiving select pivot pins projecting from the shift lever in recesses of the intermediate joint. The intermediate joint comprises opposite through holes aligned with an aperture in the shift lever for receiving the main pivot shaft. The intermediate joint is made of material having a lower modulus of elasticity than the materials of the shift lever and the shifter yoke.

10 Claims, 3 Drawing Sheets

(51) Int. Cl.
*F16H 59/10* (2006.01)
*F16H 61/36* (2006.01)

(58) Field of Classification Search
USPC .......................................... 74/473.1–473.33
See application file for complete search history.

(56) References Cited

U.S. PATENT DOCUMENTS

| | | | | |
|---|---|---|---|---|
| 6,295,886 | B1 | 10/2001 | Russell | |
| 6,612,194 | B2* | 9/2003 | DeJonge | B60K 37/06 |
| | | | | 74/335 |
| 8,322,245 | B2* | 12/2012 | Kino | F16H 59/10 |
| | | | | 74/473.3 |
| 9,273,775 | B2* | 3/2016 | Kvarnstrom | F16H 59/105 |
| 9,291,258 | B2* | 3/2016 | Magrini | F16H 59/042 |
| 10,054,219 | B2* | 8/2018 | Magrini | F16H 59/042 |
| 2003/0136213 | A1* | 7/2003 | Bunsch | F16H 59/0204 |
| | | | | 74/473.3 |
| 2008/0184837 | A1* | 8/2008 | Takikawa | F16H 59/0278 |
| | | | | 74/473.33 |
| 2013/0192404 | A1* | 8/2013 | Magrini | F16H 59/042 |
| | | | | 74/473.3 |
| 2013/0340558 | A1* | 12/2013 | Kvarnstrom | F16H 59/105 |
| | | | | 74/473.33 |
| 2016/0306380 | A1* | 10/2016 | Buschle | G05G 5/005 |

* cited by examiner

GEAR SHIFTER ASSEMBLY FOR A VEHICLE

The subject patent application is the National Stage of International Patent Application No. PCT/EP2014/078845, filed on Dec. 19, 2014, the content of which is incorporated herein by reference in its entirety.

The present invention relates to a gear shifter assembly for a vehicle comprising:
- a base to be fixed in a vehicle,
- a shifter yoke mounted to the base by a main pivot shaft to be pivotable about a first pivotal axis and comprising a cable connector at a distance to its pivotal axis for connection to a cable for transferring pivotal shifter yoke movements to a transmission,
- a shift lever mounted to the shifter yoke by a pivotal bearing arranged to allow pivotal movements of the shift lever with respect to the shifter yoke about a second pivotal axis perpendicular to the first pivotal axis between at least two pivotal positions about the second pivotal axis,
- an engagement mechanism providing positive engagement of the shift lever and the shifter yoke with respect to pivotal movements about the first pivotal axis such that the shifter yoke is pivoted about the first pivotal axis when the shift lever is pivoted about the first pivotal axis, wherein the engagement mechanism is arranged to provide this positive engagement in at least one of the two pivotal positions of the shift lever about the second pivotal axis.

The gear shifter assembly has a based fixed in a vehicle. A shifter yoke is mounted to the base to be pivotable about a first pivotal axis which normally is perpendicular to the longitudinal axis or driving direction of the vehicle. The shifter yoke further has a cable connector to which a cable is connected which extends to a transmission of the vehicle where it is connected to an actuating element of the transmission. By pivoting the shifter yoke the state of the transmission is changed, for example along a shift gate of an automatic transmission including P (park), R (reverse), N (neutral) and D (drive) positions. In order to allow to pivot of the shifter yoke a shift lever is mounted to the shifter yoke. This mounting allows pivotal movements of the shift lever with respect to the shifter yoke about a second pivotal axis perpendicular to the first pivotal axis, for example between at least pivotal select positions, in particular one position in which the shift lever is in an automatic shifter gate in which the shift lever is in positive engagement with the shifter yoke, and a second position in which there is no positive engagement with the shifter yoke such that the shift lever can be pivoted back and forth independently from the shifter yoke, for example to manually change gears. In order to provide the positive engagement of the shift lever and the shifter yoke with respect to pivotal movements about the first pivotal axis there is an engagement mechanism which provides this positive engagement when the shift lever is in a particular select position to allow to pivot the shifter yoke by pivoting the shift lever and to transit this pivotal movements by a cable to the transmission.

If the shift lever and the shifter yoke are in positive engagement, force can be transmitted from the shift lever through the shifter yoke to the cable. Since force has to be transferred through the shifter lever and the shifter yoke to the cable, both shift lever and shifter yoke have to be made of rather rigid materials to be able to transfer the force without yielding.

The shift lever is on the one hand mounted to the shifter yoke and the latter to the base by a main pivot shaft extending through an aperture in the lower end region of the shift lever, which main pivot shaft is also received in bores of the shifter yoke. In order to allow the shift lever to perform pivotal movements about the second pivotal axis, while the main pivot shaft remains stationary in the shifter yoke, the aperture at the lower end regions of the shift lever which receives the main pivot shaft has a hourglass shape in cross-section, i.e. has the lowest diameter in the centre which is just sufficiently large to allow to insert the main pivot shaft, whereas the inner walls of the aperture in the are flaring towards both outer ends of the aperture so that the shift lever may pivot about the second pivotal axis while the main pivot shaft remains stationary. Bushings are attached to the shift lever at its lower end region extending in opposite directions therefrom, wherein a straight line connecting the bushings is perpendicular to the first pivotal axis. The bushings are received in receptacles in the base such that the shift lever and the bushings may pivot about the first pivotal axis, and such that the shift lever may be pivoted about the central axis of the bushings which form the second pivotal axis.

In the prior art the shift lever was mounted by inserting it into the shifter yoke, whereafter the bushings had to be attached and disposed in the bearing receptacles in the base. When the bushings were received in their bearing receptacles the aperture at the lower end of the shift lever had to be aligned with the corresponding bores in the shifter yoke so that the main pivot shaft could be advanced through the bores and the aperture to be eventually fixed by bolts or nuts.

Since both the shift lever as well as the shifter yoke are made of rather rigid material to be able to transfer force to the cable, it was difficult to achieve a play free suspension of the shifter lever for the following reason. Either the bearings for receiving the bushings of the shifter lever in the shifter yoke and these bushings had to be provided with high precision (low tolerances), or further bearing structures had to be provided for absorbing or compensating possible manufacturing tolerances in the bushings or other bearing parts. Many parts were needed to assemble the shift lever in this manner in the shifter yoke which makes the manufacturing and assembly procedure expensive.

For mounting a shift lever to a base or housing to be pivotable about two perpendicular axes it is generally known to utilize a swivel piece or cross joint which is pivotably mounted in a housing about a first pivotal axis. The shift lever in turn is mounted to the cross joint to be pivotable with respect thereto about a second pivotal axis perpendicular to the first pivotal axis. For this purpose the shift lever is provided in the lower end region with two projecting pins which are received in complementary recesses in the cross joint and which extend along the second pivotal axis. An example for such design is disclosed in JP 2009-113639 A.

It is an object of the present invention to provide a gear shifter assembly of this kind in which few components are needed to provide a play-free bearing of the shift lever in the shifter yoke allowing pivotal movements about the first pivotal axis together with the shift yoke, and about the second pivotal axis with respect to the shifter yoke, wherein the components to provide the bearing should not require high precision or low tolerance demands.

This object is achieved by a gear shifter assembly comprising the feature of claim 1. Preferred embodiments of the invention are set out in the dependent claims.

According to the present invention an intermediate joint provides the pivotal bearing for the shift lever. The intermediate joint is attached to the lower end of the shift lever by receiving select pivot pins projecting from the shift lever in recesses of the intermediate joint. The intermediate joint also comprises opposite though holes which are aligned with an aperture in the lower end portion of the shift lever, if it is attached to the intermediate joint, for receiving a main pivot shaft which is supported by the base and which extends along the first pivotal axis through bores in the shifter yoke, the through holes of the intermediate joint and the aperture of the shifter lever to support them. The intermediate joint is made of a material having a lower modulus of elasticity than the materials of the shift lever and the shifter yoke.

Since the intermediate joint is not in the force transmission path from the shift lever, through the shifter yoke and further to the cable it can be made of more elastic material compared to the shift lever and the shifter yoke which are in the force transmission path to the cable. This on the other hand allows to compensate for manufacturing tolerances in the other parts and bearings since the intermediate joint can yield compared to the base and shifter yoke to compensate for any manufacturing tolerances or misalignments in these components and their connections. This means that the intermediate joint is configured to be more resilient than the components it is interconnecting, namely the shift lever and the shifter, so that small mismatches in the positioning of the components of the shift lever and shifter yoke which are connected to or engaged with the intermediate joint can be absorbed by yielding of the intermediate joint.

In addition, the design according to the present invention provides a simplified assembly process. In a first step the intermediate joint is attached to the lower end of the shifter lever by inserting select pins extending in opposite direction from the lower end of the shift lever into corresponding recesses in the intermediate joint. After this the shift lever with the attached intermediate joint can be handled as a single unit. When the intermediate joint is attached to the lower end of the shift lever the through holes in the intermediate joint are aligned with the aperture in the lower end region of the shift lever so that no further alignment step for them is necessary when the shift lever with the attached intermediate joint is inserted into the shifter yoke, but only the through holes of the intermediate joint have to be aligned with bores in the shifter yoke so that the main pivot shaft may be advanced through the bore in the shifter yoke, a first through hole of the intermediate joint, the aperture of the shift lever, the opposite through hole of the intermediate joint and an opposite bore of the shifter yoke, whereafter the main pivot shaft is fixed by fastening element at the ends such as bolts or nuts and is disposed in a bearing of the base which allows pivotal movements of the shifter yoke with respect to the base about the main pivot shaft.

It will be appreciated that this design according to the present invention not only simplifies the assembly process but also provides for a bearing structure for the shift lever in the shifter yoke and for the shifter yoke in the base with very few components.

In a preferred embodiment two opposing select pivot pins are extending in opposite directions from the lower end of the shift lever. The recesses for receiving the select pivot pins are two opposing, open recesses which are arranged such that the intermediate joint may be attached to the lower end of the shift lever by pressing the intermediate joint against the lower end of the shift lever when the opposing select pivot pins are disposed above the open recesses which are configured to receive the select pivot pin and to provide the attachment of the intermediate joint on the shift lever by a snap-in action.

In a preferred embodiment the intermediate joint is formed by a trough-shaped member comprising side walls surrounding an open cavity for receiving a lower end portion of the shift lever. The two open recesses are formed in opposing side walls of the trough-shaped member, and the through holes are formed in other opposing side walls shifted by 90° with respect to the open recesses such that a central axis of the select pivot pins when received in the open recesses is perpendicular to a central axis of the main pivot shaft when the received in the through holes.

The recesses may be generally U-shaped with a width equal to or only slightly larger than the diameter of the select pivot pins. Close to the upper end the side walls of the U-shaped recess are provided with inwardly projecting shoulders or protrusions. These protrusions form a restricted entry opening to the recess having a clearance distance of less than the diameter of the select pivot pins. When the select pivot pins are pressed into the recesses the side walls of the recesses are urged slightly apart at the upper end of the recesses to allow the select pivot pins to pass the inwardly projecting protrusions, whereafter the side walls elastically return so that the inwardly projecting protrusions retain the select pivot pins in the recesses.

Such an attachment of the intermediate joint on the lower end of the shifter lever by snap-in action is particularly simple and may be performed quickly without need for further connector elements or any tools. The ability of the recesses of the intermediate joint to receive and retain the select pivot pins of the shift lever by snap-in action is permitted by the characteristic of the intermediate joint to have a lower modulus of elasticity than the shift lever so that the intermediate joint is able to yield and receive the select pivot pins of the shift lever by snap-in action.

In a preferred embodiment the intermediate joint is formed by a trough-shaped member comprising side walls surrounding an open cavity for receiving a lower end portion of the shift lever, the two open recesses being formed in opposing side walls of the trough-shaped member, and the through holes being formed in opposing side walls shifted by 90° with respect to the open recesses such that a central axis of the select pivot pins when received in the open recesses is perpendicular to a central axis of the main pivot shaft when received in the though holes. Such a trough-shaped member can be made as an integrally formed component, for example by injection moulding of plastic.

In a preferred embodiment the trough-shaped member of the intermediate joint comprises a guiding rib projecting perpendicularly from a bottom surface of the intermediate joint. A complementary guiding slot is present in the base, which guiding slot extends perpendicularly to the first pivotal axis and is arranged for receiving and guiding the guiding rib of the intermediate joint when the intermediate joint is pivoting with the shift lever about the first pivotal axis. It is to be appreciated that this guiding rib stabilizes the movement path of the shift lever and the shifter yoke when they are pivoting jointly about the first pivotal axis.

In a preferred embodiment the shifter yoke is made of a first plastic material and the intermediate joint is made of a second plastic material, wherein the modulus of elasticity of the first material is at least twice as large as the modulus of elasticity of the second plastic material. It is preferred that the modulus of a elasticity of the first plastic material is at least three times larger than the modulus of elasticity of the second plastic material.

For example, it is preferred that the modulus of elasticity of the first plastic material is larger than 10.000 MPa, and that the modulus of elasticity of the second plastic material is below 3.000 MPa. The shift lever is made of a material having similar or the same characteristics as the first plastic material.

To achieve the high modulus of elasticity of the material of the shifter yoke the plastic material of the shifter yoke may include reinforcing fibres, preferably glass fibres.

The first plastic material of the shifter yoke may for example be a polyamide, for example PA66 and polyamide-imide or mixtures thereof. A typical material which can be used for the shifter yoke is the material known under the trade name Grivory GVS-5H which is a mixture of polyamide 66 and polyamide 6I/X with 50% glass fibre reinforcement. Such material has a modulus of elasticity of 16.000 MPa similar materials can be used for the shift lever.

The second plastic material of the intermediate joint may comprise a polyoximethylene (POM). A typical example of a plastic material useful for making the intermediate joint is the material known under the trade name Hostaform C9021 which is a POM copolymer which has a modulus of elasticity of about 2.700 MPa, a tensile strain at yield of 9%, and a nominal strain at brake of 30%.

The invention will now be described with reference to a preferred embodiment illustrated in the drawings in which.

Figure 3:
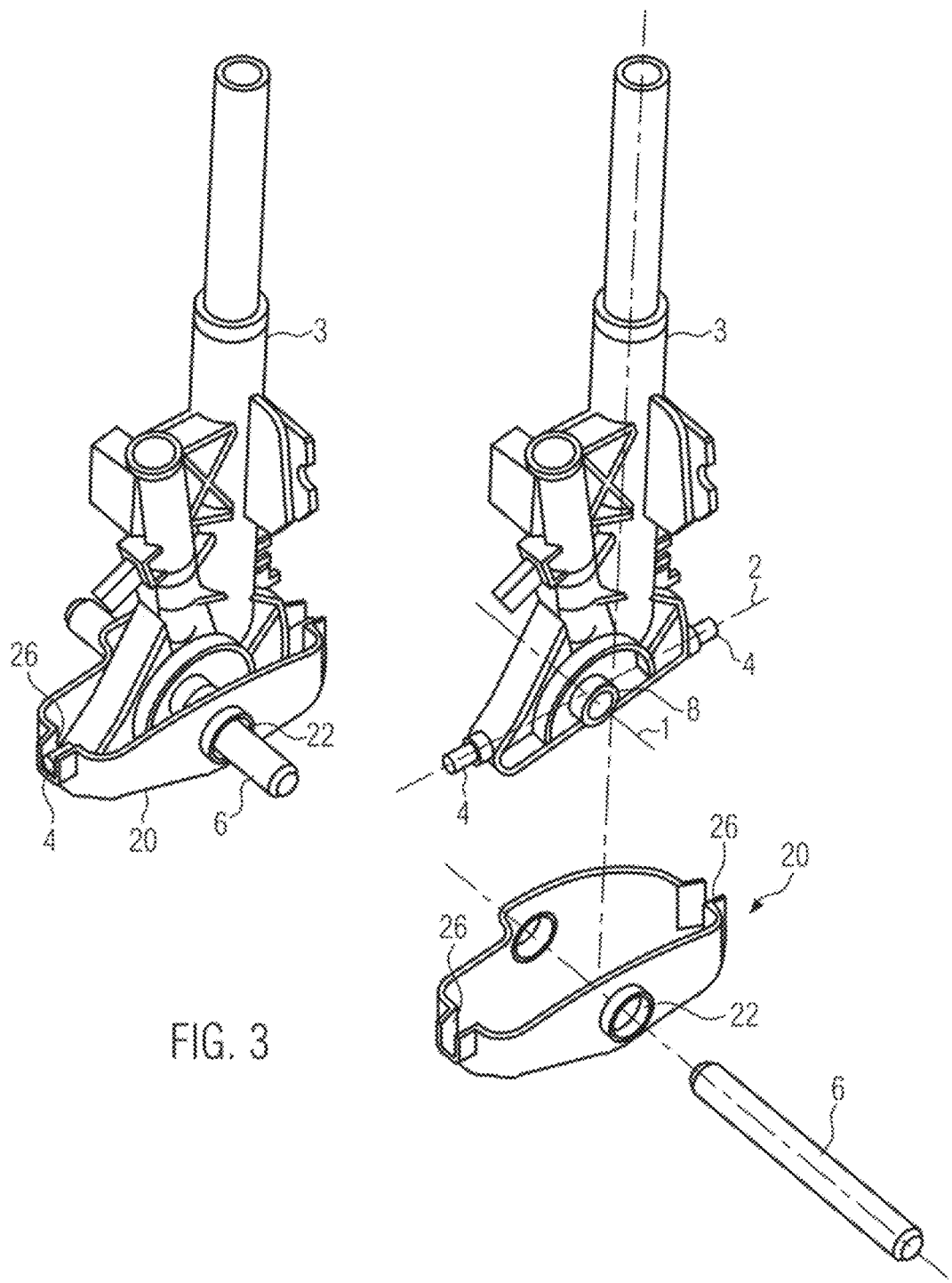
FIG. 3 shows the shift lever and an intermediate joint of the gear shifter assembly of FIG. 1, in a perspective view and an exploded view.

The gear shifter assembly of the present invention comprises a base 5 in the form of a housing to be fixed in the vehicle, for example on the vehicle floor, which base comprises a pivotal bearing for opposite bushings 7 on a main pivot shaft 6 (see FIG. 3). The bearing in the base is configured to receive the opposite bushings 7 attached on the main pivot shaft 6 to permit pivotal movements of the shift lever 3 and the shifter yoke 10 about the first pivotal axis 1 defined by the central axis of the main pivot shaft 6.

Figure 1:
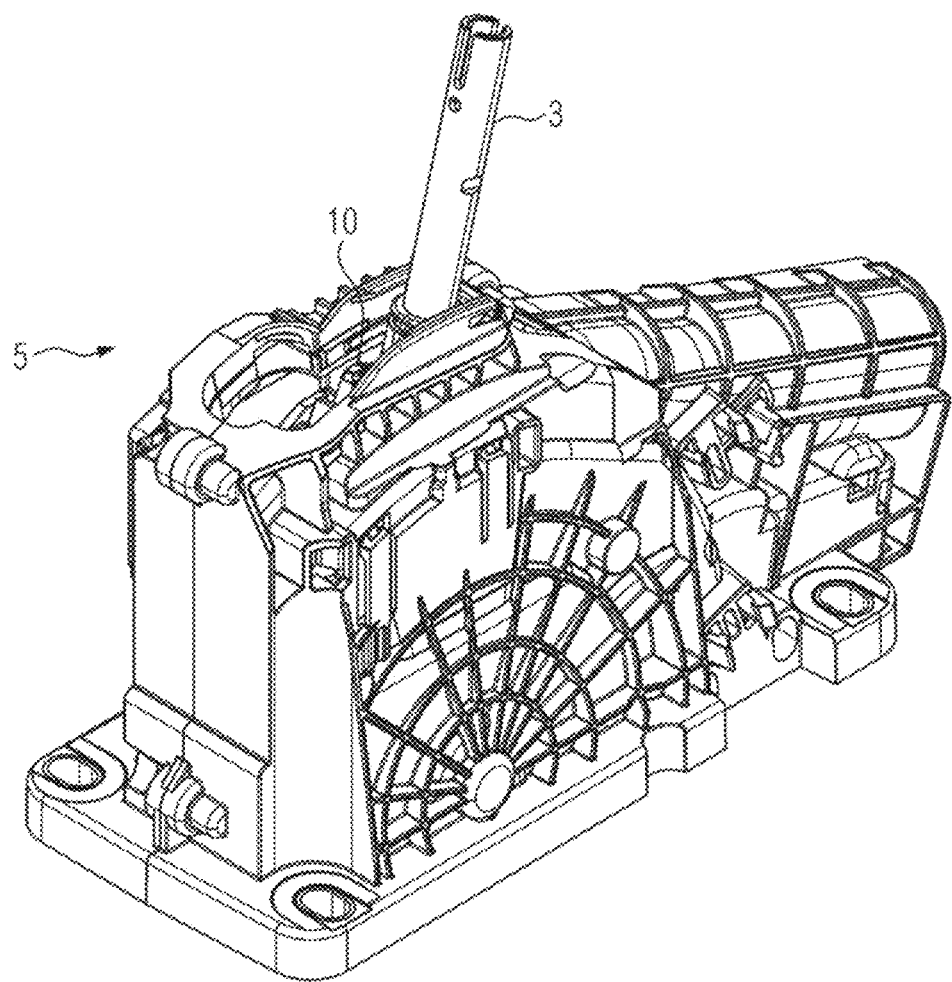
FIG. 1 shows a perspective view of a gear shifter assembly according to the present invention.
Figure 2:
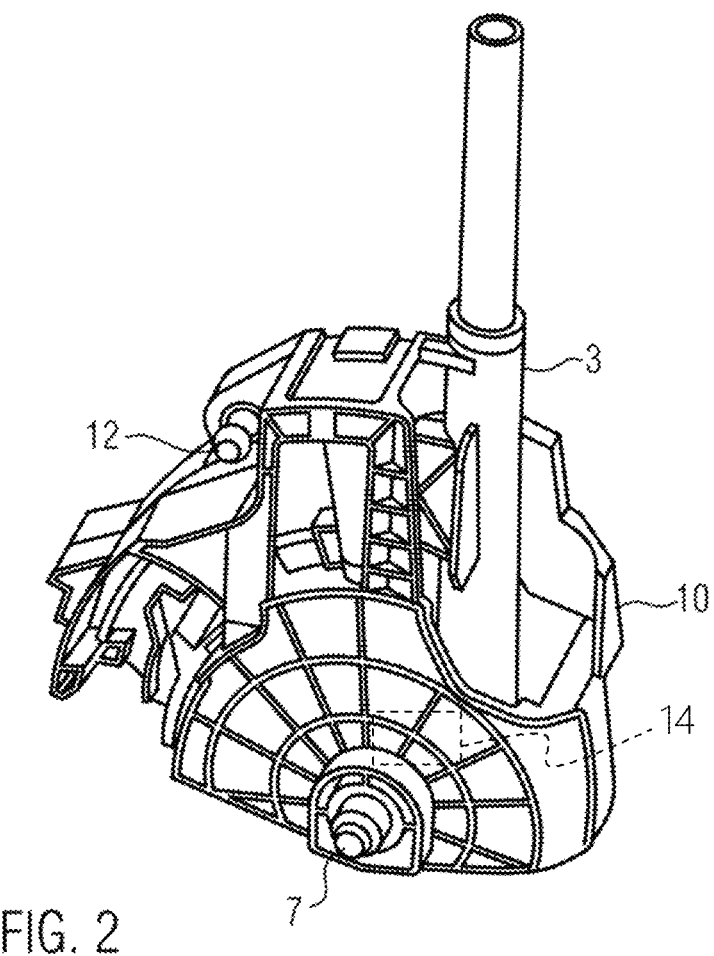
FIG. 2 shows a perspective view of a shifter yoke and shift lever of a gear shifter assembly according to the present invention.

FIG. 2 shows a perspective view of a shift lever 3 received in a shifter yoke 10. At a distance to the main pivot shaft 6 the shifter yoke 10 is provided with a cable connector 12 to which a cable can be connected. The cable extends to an actuating element on a transmission of the vehicle. By pivoting the shift lever 3 and thereby pivoting the shifter yoke 10 about the first pivotal axis the cable is moved in its longitudinal direction to transmit force to the actuating element of the transmission to execute a change in the transmission.

There is an engagement mechanism 14 in the shifter yoke 10 which provides for positive mechanical engagement of shift lever 3 and shifter yoke 10 for pivotal movements about the first pivotal axis. This positive mechanical engagement is necessary in order to allow to exert a torque on the shifter yoke 10 by pivoting the shift lever 3 about the first pivotal axis 1. In this manner a force transmission path is established which extends from the shift lever 3 through shifter yoke 10 and the cable to the actuating element of the transmission. The shift lever 3 and the shifter yoke 10 therefore have to be of sufficient strength and rigidity to allow the force transmission with-out any substantial elastic deformation.

By pivoting the shifter lever 3 about the first pivotal axis 1 and thereby pivoting the engaged shifter yoke 10 shift movements along a shift gate may be performed which comprises a sequence of shift positions such as P (park), R (reverse), N (neutral), and D (drive) to operate an automatic transmission.

Shift lever 3 is mounted to the shifter yoke 10 in a pivotal bearing arranged to allow pivotal movements of the shift lever 3 with respect to the shifter yoke 10 (and with respect to the intermediate joint) about a second pivotal axis 2 perpendicular to the first pivotal axis 1 between at least two pivotal positions about the second pivotal axis. The pivotal movements of the shift lever 3 about the second pivotal axis do not necessarily have to be between different shift gates. There are also shifter assemblies for automatic transmissions with a shift gate including P, R, N and D positions, wherein the shift lever has to be pivoted about the second pivotal axis between each of the positions mentioned, before pivoting it about the first pivotal axis to the next position. However, in another implementation of the present invention the shift lever 3 is pivotable about the second pivotal axis between two shift gates, for example the shift gate to operate the automatic transmission as described above, in which shift gate there is positive mechanical engagement between the shift lever 3 and the shifter yoke 10 provided by the engagement mechanism 14, and a second shift gate with forward and backward shift positions to allow manual shifting to a higher and lower gear. In this second shift gate the shift lever 3 can be out of engagement with the shifter yoke 10, wherein shift movements of the shift lever 3 with respect to the shifter yoke 10 are then detected by sensor arrangements which sense the shift position and cause appropriate commands to be transmitted to effect the desired gear change.

To establish the mounting of the shift lever to allow pivotal movements of the shift lever, together with the shifter yoke, about the first pivotal axis, and to allow pivotal movements of the shift lever 3 with respect to the shifter yoke 10 about the second pivotal axis 2 perpendicular to the first pivotal axis, an intermediate joint 20 is provided. As shown in FIG. 2 the intermediate joint is a trough-shaped member or cap member presenting an open cavity for receiving a lower end portion of the shift lever 3. The lower end portion of the shift lever 3 is provided with opposite select pivot pins 4 arranged to be received in open recesses 26 of the intermediate joint 20. The open recesses 26 are formed as cut-outs in opposite side walls of the trough-shaped member of the intermediate joint. As can be best seen in FIG. 3 the recess 26 is an essentially U-shaped cut-out in the side wall. The width of recess 26 is equal to or slightly larger than the diameter of the select pins 4 such that the select pins can be received in the recesses 26 allowing pivotal movements of the shift lever 3 about the second pivotal axis 2 defined by the central axis of the select pivot pins 4.

Figure 4:
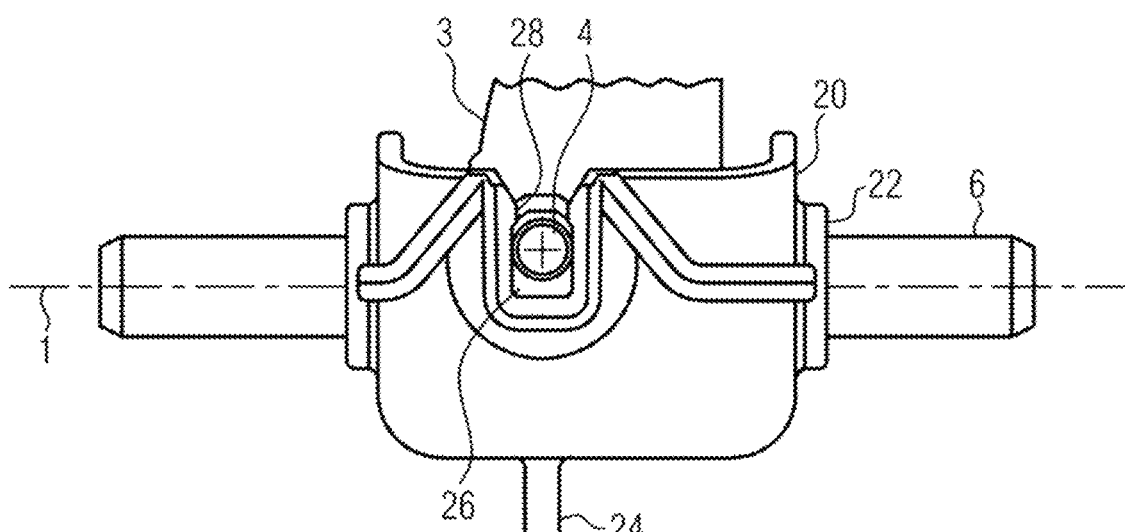
FIG. 4 shows a plan view of the intermediate joint and the main pivot shaft along the direction of the second pivot axis.

As can further be seen in FIG. 4 each open recess 26 comprises a restricted entry opening. In this respect the side walls of the recess 26 are, at the end portion adjoining the open end of the recess 26, provided with inwardly projecting protrusions 28. These protrusions 28 are arranged such that they leave a clearance or open distance smaller than the diameter of the select pins so that the select pins 4 are retained in the recesses 26 once inserted therein. The intermediate joint 20 is made of a material having a lower modulus of elasticity than the shift lever 3 and the shifter yoke 10. In particular, the intermediate joint 20 is made of a low modulus of elasticity material and configured such that the select pivot pins 4 may be pushed into the recesses 26, wherein the recesses 26 with restricted entry opening provide a snap-in action in the process of inserting the select pins into the recesses 26. When the select pivot pins 6 are pressed into the recesses 26 the side walls of the recesses are urged slightly apart by elastic deformation to allow the select pivot pins to pass the inwardly projecting protrusions 28. Once the select pivot pins 4 passed the inwardly projecting protrusions 28 with its full diameter the side walls elastically return so that the inwardly projecting protrusions 28 retain the select pivot pins 4 in the recesses 26. In this manner the intermediate joint 20 can in a simple manner be attached to the shift lever 3 by simply pressing the intermediate joint onto the lower end of the shift lever 3 such that the select pivot pins 4 are pushed into the recesses 26 and are received and retained therein by snap-in action. This simple step can be carried out without any further fastening components and without any tools. After attaching the intermediate joint 20 to the lower end of the shift lever 3 both can be handled as a unit.

When the intermediate joint 20 is attached to the shift lever 3 through holes 22 in opposite side walls of the intermediate joint 20 are aligned with an aperture 8 in the lower end portion of the shift lever 3. The through holes 22 and the aperture 8 permit that, at a later stage, a main pivot shaft 6 is inserted. The aperture 8 in the shift lever 3 is not a cylindrical bore but has an hourglass shape in cross-section. This means that the aperture 8 has the smallest diameter in the middle, wherein this diameter is equal to or slightly larger than the diameter of the main pivot shaft 6. Starting from the middle of the aperture 8 the inner walls are flaring to both outer ends of the aperture 8. This shape of the aperture 8 permits pivotal movements of the shift lever 3 about the second pivotal axis 2 within the intermediate joint 20, while the main pivot shaft 6 extending through the through holes 22 and the aperture 8 remains stationary.

As can also be seen in FIG. 4 the main pivot shaft 6 is positioned in the through holes 22 to support the shift lever 3 by extending through its aperture at a level such that the select pivot pins 4 extending from the lower end portion of the shift lever 3 are held within the recesses 26 above the bottom of the recesses 26 so that there is only a minimal friction when the shift lever 3 is pivoted about the second pivotal axis which is accompanied by a rotational movement of the select pivot pins 4 within the recesses 26.

However, before the main pivot shaft 6 is inserted as shown in FIG. 3 the shift lever 3 with the attached intermediate joint 20 is introduced through an opening into a cavity of the shifter yoke 10. The shift lever 3 with the attached intermediate joint 20 is then moved to its mounting position within the shifter yoke such that the through holes 22 of the intermediate joints 20 are aligned with a bore in opposite walls of the shifter yoke 10. Then the main pivot shaft 6 is introduced into the bore of the shifter yoke 10, advanced through a through hole 22 of the intermediate joint 20, further through aperture 8 of the shift lever 3, through an opposite through hole 22, and eventually through a bore in the opposite wall of the shifter yoke 10. The main pivot shaft 6 is fixed by attaching fastening elements at the opposite ends of the main pivot shaft 6, such as bolts or nuts. Eventually the opposite ends of the main pivot shaft are covered by bushings 7 which are mounted in a pivotal bearing formed in the base 5 to allow pivotal movements of the shifter yoke 10 with respect to the base.

The intermediate joint 20 is made of a material having a lower modulus of elasticity than the shift lever 3 and the shifter yoke 10 and the shift lever 3. Therefore, the intermediate joint can absorb manufacturing tolerances or misalignments between the shift lever 3 and the shifter yoke 10 by elastically yielding. This elasticity of the intermediate joint does not affect the force transmission capability from shift lever 3, through shifter yoke 10 to the cable attached to the cable connection 12 since the shift lever is in positive mechanical engagement with the shifter yoke with respect to the first pivot axis.

A suitable material for the intermediate joint is for example polyoximethylene (POM). Commercially available polyoximethylenes have a range of modulus of elasticity of about 2.500 to 3.500 MPa. The intermediate joint 20 may for example be formed by injection moulding such material to produce an integrally formed member as intermediate joint 20.

The relatively low modulus of elasticity of the intermediate joint 20 compared to the shift lever 3 and the shifter yoke 10 also permits to arrange the recesses 26 to have an elastically deformable entry opening such that the select pivot pins 4 may be pushed in and then reach a retained state by snap-in action within the recess.

The shift lever 3 and the shifter yoke 10 are in the force transmission path between the shift lever and the cable which eventually actuates the actuating element of the transmission, and therefore have to have a higher rigidity to keep elastic deformation within these parts low when force is transmitted.

A suitable material for the shift lever 3 and the shifter yoke 10 is for example a polyamide. Such a material can be provided with a modulus of elasticity which can be set within a wide range by adding variable amounts of reinforcing fibres, in particular glass fibres. Preferably the amount of reinforcing fibres is chosen such that the modulus of elasticity of the shifter yoke 10 is at least twice as large as that of the intermediate joint 20, preferably more than three times as large. In absolute terms, the modulus of elasticity of the material of the shifter yoke and the shift lever should be above 10.000 MPa, and the modulus of elasticity of the material of the intermediate joint should be below 3.000 MPa.

A typical material is suitable for manufacturing the shifter yoke is a mixture of a polyamide PA66 with polyamide-imide PA 6I/X with glass fibre reinforcement. In case of a glass fibre content of 50% such material is referred to as PA66 plus PAI/X-GF50.

The shift lever 3 can for example be made of polybutylene terephthalate (PBT) with glass fibre reinforcement, for example with a glass fibre content of 30%.

The invention claimed is:

1. A gear shifter assembly for a vehicle comprising:
   a base to be fixed in a vehicle;
   a shifter yoke mounted to the base by a main pivot shaft to be pivotable about a first pivotal axis, the shifter yoke comprising a cable connector at a distance to the first pivotal axis for connection to a cable for transferring pivotal shifter yoke movements to a transmission;
   a shift lever mounted to the shifter yoke by an intermediate joint configured to allow pivotal movements of the shift lever with respect to the shifter yoke about a second pivotal axis perpendicular to the first pivotal axis between at least two pivotal positions about the second pivotal axis;
   an engagement mechanism providing a positive engagement between the shift lever and the shifter yoke with respect to pivotal movements about the first pivotal axis such that the shifter yoke is pivoted about the first pivotal axis when the shift lever is pivoted about the first pivotal axis, wherein the engagement mechanism is arranged to provide the positive engagement in at least one of the two pivotal positions of the shift lever about the second pivotal axis; and wherein the intermediate joint is attached to a lower end of the shift lever by receiving select pivot pins projecting from the shift lever in recesses of the intermediate joint, wherein the intermediate joint comprises opposite through holes which, when the intermediate joint is attached to the shift lever, are aligned with an aperture in the lower end portion of the shift lever for receiving the main pivot shaft which is supported by the base, the main pivot shaft extends along the first pivotal axis and through a bore in the shifter yoke, the through holes of the intermediate joint, and the aperture of the shifter lever to support the shifter yoke, the shifter lever, and the intermediate joint from the base, and wherein the intermediate joint includes a material having a lower modulus of elasticity than a material of the shift lever and a material of the shifter yoke.

2. The gear shifter assembly according to claim 1, wherein the shift lever includes two opposing select pivot pins extending in opposite directions from the lower end of the shift lever, and wherein the recesses of the intermediate joint include two opposing, open recesses which are arranged such that the intermediate joint may be attached to the lower end of the shift lever by pressing the intermediate joint against the lower end of the shift lever when the opposing select pivot pins are disposed above the open recesses, each of the open recesses are configured to receive a corresponding select pivot pin and to provide the attachment of the intermediate joint on the shift lever by a snap-in action.

3. The gear shifter assembly according to claim 2, wherein the intermediate joint is formed by a trough-shaped member comprising side walls surrounding an open cavity for receiving the lower end of the shift lever, the two open recesses being formed in opposing side walls of the trough-shaped member and the through holes being formed in other opposing side walls shifted by 90° with respect to the open recesses such that a central axis of the select pivot pins when received in the open recesses is perpendicular to a central axis of the main pivot shaft when received in the through holes.

4. The gear shifter assembly according to claim 3, wherein the open recesses are formed by U-shaped cut-outs in opposite side walls of the trough-shaped member of the intermediate joint, open ends of the U-shaped cut-outs being restricted by protrusions inwardly projecting from the walls of the open recesses, the protrusions are spaced apart a clearance distance of less than the diameter of the select pivot pins to retain the select pivot pins in the recesses once inserted by snap-in action.

5. The gear shifter assembly according to claim 3, wherein the trough-shaped member of the intermediate joint comprises a guiding rib projecting perpendicularly from a bottom surface of the intermediate joint, the base includes a guiding slot that extends perpendicular to the first pivotal axis and is arranged for receiving and guiding the guiding rib of the intermediate joint when the intermediate joint is pivoting with the shift lever about the first pivotal axis.

6. The gear shifter assembly according to claim 1, wherein the shifter yoke includes a first plastic material and the intermediate joint includes a second plastic material, the modulus of elasticity of the first material is at least twice as large as the modulus of elasticity of the second plastic material.

7. The gear shifter assembly according to claim 6, wherein the modulus of elasticity of the first material is at least three times larger than the modulus of elasticity of the second plastic material.

8. The gear shifter assembly according to claim 7, wherein the modulus of elasticity of the first material is larger than 10.000 MPa, and the modulus of elasticity of the second plastic material is below 3.000 MPa.

9. The gear shifter assembly according to claim 1, wherein the shifter yoke includes a plastic material including reinforcing fibres.

10. The gear shifter assembly according to claim 1, wherein the shifter yoke includes a plastic material including glass fibres.

* * * * *